United States Patent [19]

Mágori

[11] 4,213,197

[45] Jul. 15, 1980

[54] CIRCUIT ARRANGEMENT OF AN ULTRASONIC-PRESENCE MOTION DETECTOR, PARTICULARLY FOR A NON-CONTACT CONTROL OF A WATER FAUCET

[75] Inventor: Valentin Mágori, Munich, Fed. Rep. of Germany

[73] Assignee: Siemens Aktiengesellschaft, Berlin & Munich, Fed. Rep. of Germany

[21] Appl. No.: 895,950

[22] Filed: Apr. 13, 1978

[51] Int. Cl.$^2$ ............................................. G01S 9/66
[52] U.S. Cl. ......................................... 367/94; 367/96
[58] Field of Search ................ 340/1 R, 3 D; 343/7.7, 343/5 PD

[56] References Cited

U.S. PATENT DOCUMENTS

| | | | |
|---|---|---|---|
| 3,372,389 | 3/1968 | Bellman et al. | 343/7.7 X |
| 3,681,745 | 8/1972 | Perlman et al. | 343/7.7 X |
| 3,863,196 | 1/1975 | Hilles | 340/1 R |
| 3,967,283 | 6/1976 | Clark et al. | 343/5 PD |
| 4,141,091 | 2/1979 | Pulvari | 340/3 D |

Primary Examiner—T. H. Tubbesing
Attorney, Agent, or Firm—Hill, Van Santen, Steadman, Chiara & Simpson

[57] ABSTRACT

A circuit arrangement is disclosed which is suitable for ultrasonic-presence motion detection in which an ultrasonic transducer is provided as a transmitter and an ultrasonic transducer is provided as a receiver. An oscillator produces an ac voltage for the transmitting transducer, a gate circuit is provided in order to chronologically control the feeding of wave forms of the oscillator to the transmitting transducer, and a receiver circuit is provided which is connected to a receiving transducer and which obtains a received signal from the receiving transducer. An evaluation circuit is also provided. The receiver circuit has a phase discriminator in order to recognize the value of a phase displacement between the ac voltage of the oscillator and the respective received signal. An electronic storage circuit is connected to the output side of the phase discriminator and stores the output signal of the phase discriminator at predetermined periodically recurring time points which are determined by read-out pulse signals at the respective time points. The evaluation circuit comprises a comparator circuit in order to compare the individual or several consecutive stored values of the electronic storage circuit. The comparator circuit comprises a threshold function so that an output signal of the circuit arrangement is produced when the individual stored values or the mean values of a number of consecutive stored values differ from one another by more than a prescribed value. The output signal indicates the motion-presence phenomenon.

3 Claims, 3 Drawing Figures

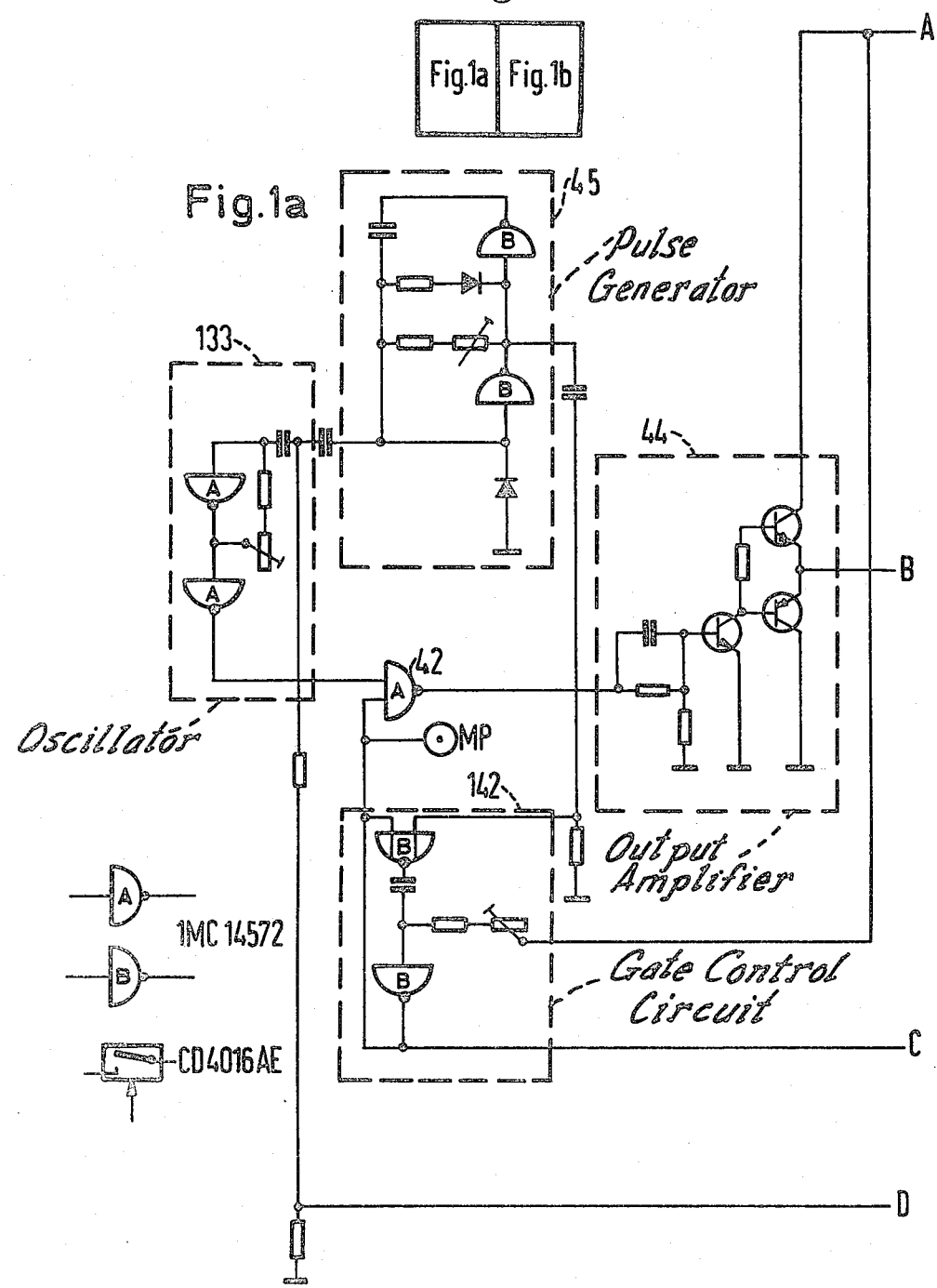

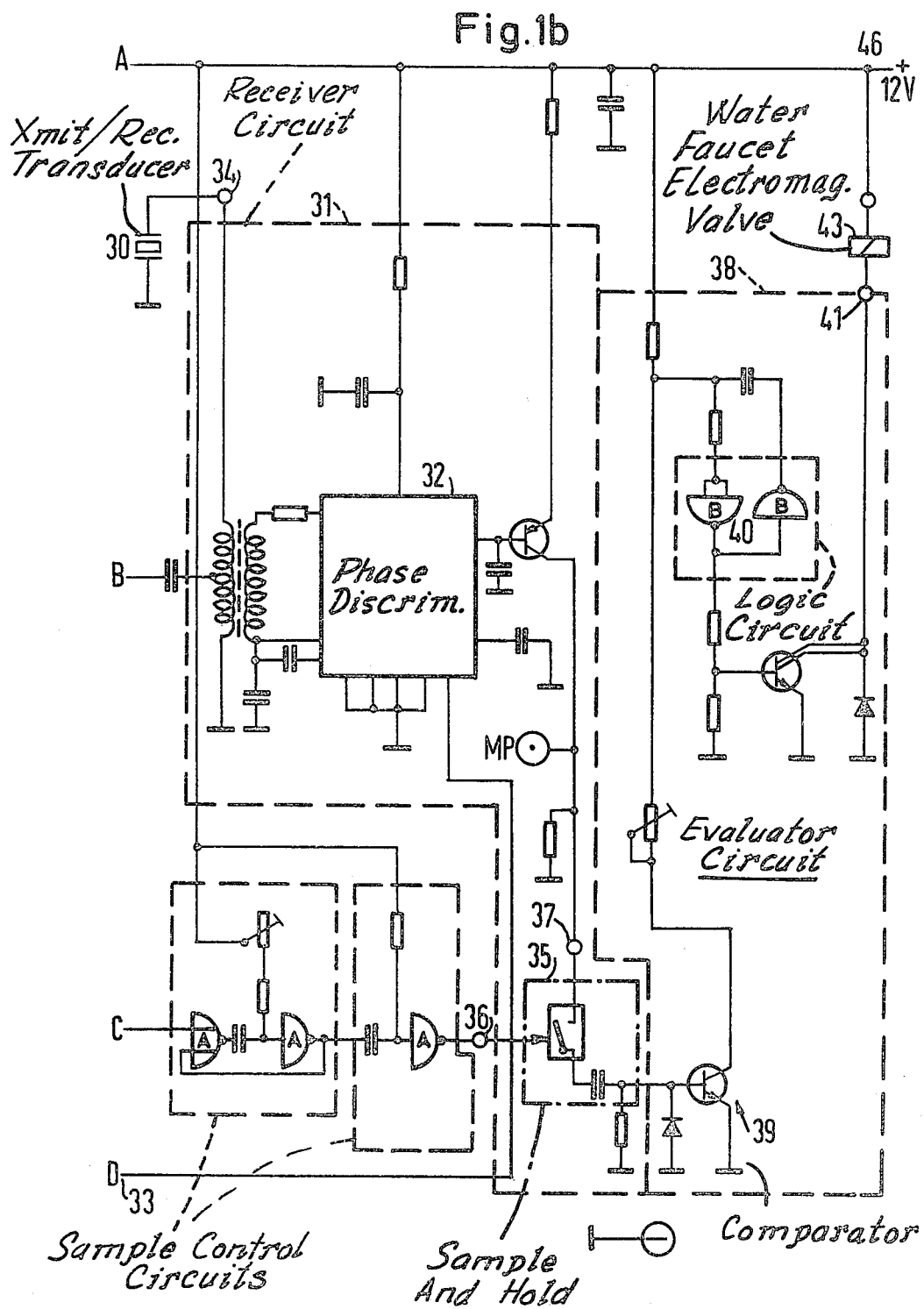

CIRCUIT ARRANGEMENT OF AN ULTRASONIC-PRESENCE MOTION DETECTOR, PARTICULARLY FOR A NON-CONTACT CONTROL OF A WATER FAUCET

BACKGROUND OF THE INVENTION

1. Field of the Invention

The invention relates to a circuit arrangement which is suitable for an ultrasonic-presence-motion detector which has an ultrasonic transducer as a transmitting transducer and an ultrasonic transducer as a receiving transducer, and more particularly to such a circuit in which an oscillator produces an ac voltage for the transmitting transducer and a gate circuit is provided in order to chronologically control the feeding of wave forms of the ac voltage to the transmitting transducer, and a receiver circuit is provided which is connected to a receiving transducer and which obtains a received signal from the receiving transducer and feeds an evaluation circuit.

2. Description of the Prior Art

Ultrasonic motion detectors for non-contact opening and closing of a water faucet are well known in the art. In such detectors, the ultrasonic waves emitted by an ultrasonic transmitter impinge upon an object, for example, upon the hands situated beneath the opening of the faucet. The emitted ultrasonic radiation is reflected by the hands and a portion of this reflected radiation reaches an ultrasonic receiver transducer. The transducer produces a corresponding signal which is evaluated by an appertaining electronic circuit. The evaluation signal is then utilized for opening and closing an electro-magnetic valve.

It is of primary importance for warm water installations that a water faucet be operated by non-contacting operation, is not unnecessarily opened or remains open. Therefore, the ultrasonic detector device does not respond to a receptacle standing in the wash basin or to a cloth laid over the water faucet, and the operation takes place normally in the accordance with the principle of Doppler-frequency shifted ultrasonic detection.

This limitation with respect to moving objects, however, is not sufficient in itself, in that the water faucet understandably is not to respond to persons, for example, merely passing the wash basin, or to an opening door, situated in proximity to the wash basin. Measures are also to be taken that the ultrasonic detector device does not respond to the running water jet itself, as this would lead to a continuous opening of the water faucet.

There are already a number of suggestions in order to solve the previously-mentioned problems, which again individually have disadvantages, particularly with respect to an insufficient operating safety.

SUMMARY OF THE INVENTION

The primary object of the invention is to provide an improved circuit arrangement of the type generally mentioned above such that the arrangement affords increased operating safety.

This object is achieved in a circuit arrangement of the type generally mentioned above wherein the receiver circuit has a phase discriminator to recognize the value of a phase displacement between the ac voltage of the oscillator and the respective received signal. An electronic storage circuit is connected to the output side of the phase discriminator to store the output signal of the phase discriminator at predetermined, periodically recurring time points which are determined by read-out pulse signals. An evaluation circuit comprises a comparator circuit for comparing individual or several consecutively stored values of the electronic storage circuit and has a threshold function so that an output signal of the circuit arrangement is produced when the amount of the individual stored values or the mean values of a number of consecutive stored values differ from one another by more than a prescribed value, so that the output signal indicates the motion-presence phenomenon.

The present invention not only has the object of utilizing the Doppler frequency-shift of a moving object to be detected, but obtains, with the aid of a simple circuit, on the one hand, however, a circuit which is particularly safe against intentional interference, in that the detection range is spatially narrowly defined. This is obtained, in accordance with the present invention, with the aid of an electronic storage circuit which is subordinate to the phase discriminator and which experiences read-out pulsing. The read-out pulsing is not only synchronous, according to the present invention, but also time-displaced in relation to the timing pulse of the ultrasonic pulse emission in a particularly apportioned manner.

The ac voltage necessary for exciting the ultrasonic transmitting transducer, which can simultaneously represent the ultrasonic receiving transducer, also, according to the present invention, is fed to the circuit arrangement by way of a gate circuit so that the transmitting transducer only receives chronologically defined wave trains of the ac voltage of the oscillator. The frequency of the oscillator voltage is tuned to the transmitting transducer and to the receiving transducer such that the two, together, have an optimum effect with respect to their intended functions, namely that the transmitting transducer exhibits a radiation as advantageous as possible having a maximum amplitude of the ultrasonic field, and the receiving transducer receives an ultrasonic signal of an object to be detected, the signal being that which is reflected as much as possible. The frequency of the exciting ac voltage in the normal case lies at least in the proximity of the resonant frequency of an oscillating mode of the transmitting transducer, which is particularly advantageous for radiation. The same apportionment along these lines is preferred for the receiving transducer. With the resonant frequency to be considered, differences known per se result, depending whether a low input impedance or a high input impedance of the respective transducer is desired, which determines the operation of the transducer either in series resonance or in parallel resonance.

According to the invention, the transmitting transducer only transmits a relatively short wave train of an ultrasonic signal which is reflected by objects located in the propagation range of the ultrasonic radiation. The ultrasonic reflection signal is picked up by the receiving transducer and is transformed into an electrical signal. This electrical signal is amplified and fed to a phase discriminator, together with the oscillator ac voltage. When receiving a signal, the phase discriminator provides a voltage corresponding to the phase relation which exists between the electric receiver signal and the ac voltage of the oscillator. Indeed, with moving objects it can be determined that the phase of the receiver signal vis-a-vis the phase of the oscillator voltage alters from one read-out pulse to the next read-out pulse, i.e.

from one pulse period to the next pulse period, which leads to an output signal of the phase discriminator which alters from pulse to pulse.

With the aid of a read-out timing pulse, which follows the transmitting pulse in a rigid chronological interval, the output voltage of the phase discriminator present at the instant of the read-out timing pulse is fed to an electronic memory, advantageously a so-called "sample and hold" circuit. This output voltage is stored in the memory up to the time of the next read-out timing pulse of the following pulse period.

In case a moving object is at such a distance from the transmitting transducer which corresponds with the chronological interval between the transmitting pulse and the time of the read-out timing pulse, the stored signal alters from pulse period to pulse period. The amount of alteration of the respectively stored values supplies a first output signal which is further processed into the output signal of the circuit arrangement constructed in accordance with the present invention.

In case of a "sample and hold" circuit, this first output signal is an ac voltage which, after rectification, is fed to an evaluation circuit having a threshold function.

Due to the length of the ultrasonic transmitting pulses, a distance range results, instead of a precise distance value, for which an evaluation results.

The definition of the response of the circuit arrangement constructed in accordance with the present invention for moving objects within a distance range need not be limited to a single distance range. Rather, two or more prescribed distance ranges can be provided. An additional storage circuit, for example, a "sample and hold" circuit can be provided for each prescribed distance range, which circuit lies in parallel, or is effective in parallel, to the aforementioned storage circuit, and which receives a respective read-out pulse, said read-out pulse having a different chronological interval of the aforementioned emission pulse of the transmitting transducer. This other chronological interval corresponds with a different distance range for which the circuit arrangement of the present invention is designed for signal detection or is sensitive, respectively, via the storage circuit.

The detection in various distance ranges can also be utilized for the release of various functions.

A circuit arrangement constructed in accordance with the present invention which is sensitive for two distance ranges, i.e. an ultrasonic presence detector which responds to moving objects in two distance ranges, can, for example, be designed for a non-contact control of a water faucet such that the one distance range, viewed from the transmitting transducer, lies short of the water jet, while the other distance range lies shortly behind the water jet. Then, the water jet per se is "diaphragmed-out" or "windowed" and thus cannot cause a release signal. This can then, for example, be of interest when dripping water could otherwise lead to a signal release. The two distance ranges mentioned thereby lie so closely one behind the other that a moving object, for example, hands, brought into the range of the water jet to be released, safeguards an actuation of the detector, at any rate.

Not only for the case of an individual distance range, but also for several distance ranges, the length of a distance range can controllably be altered in the direction of the ultrasonic radiation. The time interval can be lengthened or adjusted by means of a corresponding length of the ultrasonic transmitting pulse, whereas received reflection signals are evaluated by this circuit arrangement.

The width of the distance range can be, by prescription, selected by selecting the width of the radiation lobe of the ultrasonic transmitting transducer and of the ultrasonic receiving transducer.

By selecting the length of the read-out timing pulse fed to the "sample and hold" circuit, an integration in the "sample and hold" circuit is carried out. This integration provides that signals of objects moving so rapidly that phase shifts based on such a movement disappear by a medium value formation are no longer registered. This is synonymous with decreasing the limit of the velocity value while increasing the length of the read-out timing pulse for which the circuit arrangement of the present invention is still sensitive.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block schematic indication illustrating the arrangement of FIGS. 1a and 1b; and FIGS. 1a and 1b together are a schematic circuit diagram of a circuit arrangement constructed in accordance with the present invention.

DESCRIPTION OF THE PREFERRED EMBODIMENTS

Referring to FIGS. 1a and 1b, arranged as indicated in FIG. 1, a transducer 30 represents the transmitting transducer and the receiving transducer. A receiver circuit 31 is bounded by a broken line and is seen to comprise a phase discriminator or product detector 32. A connection point 33, additionally referenced to D in FIG. 1b, for example, is connected to receive an oscillator voltage produced by an oscillator 133 (FIG. 1a). The receiver signal occurring in the transducer 30 on the basis of the reflected portion of an emitted ultrasonic radiation is applied to a connection point 34. The memory or "sample and hold" circuit 35 is enclosed by a dash-dot line and receives the output signal of the product detector 32 by way of a connection point 37. The read-out signal pulse for the "sample and hold" circuit 35 is connected to a switching point 36. The evaluation circuit 38 (to the right of the receiver circuit 31) is also enclosed within a broken line. The evaluator circuit 38 contains a comparator circuit 39, here essentially represented by a transistor. The logic circuit 40, for example, two CMOS inverters, effects a threshold function for the comparator circuit 39. The output signal of the circuit arrangement constructed in accordance with the invention occurs at a connection point 41. A gate circuit for the ultrasonic transmitting pulse is referenced 42 and is controlled by the duration of the transmitting pulse by a circuit 142. An output amplifier for the electric transmission output of the ultrasonic transmitter is referenced 44. The pulse sequence frequency is determined by a pulse generator 45. The circuit illustrated, as provided for the use of a non-contact control of a water faucet, i.e. in order to control an electromagnetic valve 43 for the water faucet. The connection for the supply voltage of, for example, 12 volt is referenced 46.

For a practical ultilization in a water faucet, a length of the ultrasonic transmitting pulse of approximately 0.5 ms results in a length of the distance range in which response sensitivity of the circuit arrangement of the present invention is present, which range is approximately apportioned at 8 cm.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement suitable for ultrasonic-presence motion detection to operate an electromechanical valve of a water faucet, and being of the type having an ultrasonic transducer as a transmitting transducer and as a receiving transducer, in which an oscillator produces an AC voltage for the transmitting transducer and a gate circuit is provided in order to chronologically control the feeding of wave trains of the oscillator AC voltage to the transducer, and wherein a receiving circuit is connected to the transducer and obtains a received signal therefrom, and wherein an evaluation circuit is provided, the improvement therein comprising:

means connected to said gate circuit and operable to produce a gate pulse to feed the oscillator AC voltage to the transducer for a period of time determined by the length of the gate pulse which defines the length of a distance range over which said circuit arrangement is responsive to motion;

a phase discriminator in the receiver circuit connected to said gate circuit to receive the oscillator AC voltage and connected to said transducer for receiving the respective received signal;

an electronic storage circuit including a sample and hold circuit connected to said phase discriminator for storing the output signal thereof at prescribably periodically recurring time points which are determined by read-out signals applied to said sample and hold circuit;

means connected to said sample and hold circuit for generating the read-out pulse signals; and a comparator circuit in said evaluation circuit connected to said sample and hold circuit for comparing signal values stored by said sample and hold circuit, said comparator circuit having a threshold function and means operable to provide an output signal to the electromechanical valve of the water faucet indicative of the presence phenomenon in response to comparison in which the compared values differ from one another by more than a predetermined value.

2. The improved circuit arrangement of claim 1, wherein said phase discriminator is a product detector which is operable to provide the difference frequency between the ac oscillator voltage and a received signal.

3. The improved circuit arrangement of claim 1, wherein said means for producing read-out pulses is an adjustable circuit, wherein the detection range for velocity values of an object to be detected is adjustably provided for high velocity values by the length of the read out pulses.

* * * * *